(12) United States Patent
Lee

(10) Patent No.: US 6,301,346 B1
(45) Date of Patent: Oct. 9, 2001

(54) HOLD-OFF ALERT SYSTEM

(76) Inventor: Issac Michael Lee, 969 Clark St., Upland, CA (US) 91784

( * ) Notice: Subject to any disclaimer, the term of this patent is extended or adjusted under 35 U.S.C. 154(b) by 0 days.

(21) Appl. No.: 09/433,915

(22) Filed: Nov. 3, 1999

(51) Int. Cl.[7] .................................................. H04M 1/00
(52) U.S. Cl. ............................................................. 379/162
(58) Field of Search .................................... 379/162, 163, 379/201, 210, 211, 212, 213, 215, 265, 266, 309

(56) References Cited

U.S. PATENT DOCUMENTS

| | | | |
|---|---|---|---|
| 5,095,504 | * | 3/1992 | Nishikawa et al. ............... 379/162 |
| 5,497,415 | * | 3/1996 | Kagi ..................................... 379/393 |
| 5,546,454 | * | 8/1996 | Harrington .......................... 379/265 |
| 5,764,746 | * | 6/1998 | Reichelt ............................... 379/207 |
| 5,838,778 | * | 11/1998 | Jung ..................................... 379/182 |
| 6,219,415 | * | 4/2001 | Deutsch et al. .................... 379/215 |

\* cited by examiner

*Primary Examiner*—Binh Tieu
(74) *Attorney, Agent, or Firm*—Richard Yoon

(57) ABSTRACT

Hold/off Alert System helps minimize the loss of time when people are put on hold. The invention can alert callers audibly when they are released from a hold state. The said system and its function are integrated to the existing phones, requiring some modifications to both calling phones and called phones. Its working components include, but not limited to, a tone detector circuit, the HAS button, the speech network, the buzzer, its driver, the MPU, and the HAS lamp for the calling phone; and the hold button, the hold-release button, the CPU, and the DTMF dialer for the called phone. The pressing of the hold or the hold-release buttons generates DTMF tone signals in the called phone which are transmitted to the calling phone to trigger a sound alert.

11 Claims, 3 Drawing Sheets

FIG.4

|  | HAS-enable mode presence of the 1st tone signal | | HAS-disable mode absence of the 1st tone signal | |
| --- | --- | --- | --- | --- |
|  | lamp | buzzer | lamp | buzzer |
| HAS button pressed on | on | on after the receipt of the 2nd tone signal | off | off |
| HAS button not pressed | off | off | off | off |

HOLD-OFF ALERT SYSTEM

BACKGROUND OF THE INVENTION

1. Field of the Invention

This present invention relates to field of telephone communication devices. In particular, the present invention relates to a Hold/off Alert System (HAS), audibly alerting the held party on a telephone when he or she is released from a hold state.

2. Background of the Invention

Each and everyday, millions of people are spending millions of hours, holding and waiting on their phones—an idling non-activity. The Hold/off Alert System could enhance their productive capacity by allowing them to free their hands and work freely near the phone while they are on hold. Some callers may use speakerphones to free their hands, but speakerphones are rather expensive and not frequently used for a common household telephone. Moreover, callers may get annoyed from hearing repeated commercial messages from speakerphones and lots of background noise. An object of this invention is to let callers free their hands and work freely near their phones while waiting on hold. Thus, callers are alerted by a brief ring or beeps when the called phone inactivates the hold function.

There had been a few similar inventions which was purported to achieve the same function. As early as in 1976, Caffine noticed the inconvenience of the phone-holding condition and patented a related invention with U.S. Pat. No. 3,961,142 with a poor result due to its complexity and its reliance on an ineffective voice recognition arrangement to set off an alert sound. After Caffine's invention, Dubner disclosed a better and less costly device with U.S. Pat. No. 4,425,479 but it still was dependent on an ineffective voice recognition means to set off an alarm. A second series of patents departed from voice recognition aspects, and instead relied on a message playback recorder to allow callers to be called back. For example, U.S. Pat. No. 4,834,552 uses a means to reach the party on hold via the use of a message playback recorder. This could be a time-consuming and irritating process for the hold-initiating party, especially when numerous callers use the system. In 1998, another automated telephone hold device was disclosed in U.S. Pat. No. 5,822,403, where a voice playback mechanism was again used to inform the hold-initiating party what must be done to reach the party on hold. The present invention departs from such voice playback mechanisms and eliminates the above mentioned time-consuming process by transmitting and receiving information via the multiple use of automatically generated DTMF signals. Due to such a feature, the called party does not have to follow any routines to talk to the party on hold as in the message playback means. In addition, the Hold/off Alert System uses DTMF tone signals to overcome the problems with the aforementioned voice recognition means in the prior art. The Hold/off Alert System also differs from earlier inventions because it is an integral part of a telephone or a telephone system and not a separate device.

SUMMARY OF THE DISCLOSURE

The addition of the Hold/off Alert System or HAS to telephones can change the way people think about calling big companies and being put on hold for an indefinite amount of time. When people are placed on hold, they can simply activate the Hold/off Alert System by pressing a button and wait for an alert ring which indicates that their phones are released from a hold state. The Hold/off Alert System function will operate with multiple transmissions of a DTMF tone signal from a called telephone to a calling telephone; thus the called telephones compatible with HAS send DTMF signals which can be then recognized by calling telephones as HAS signals. Upon recognition of the first HAS signal, the calling telephone enables HAS switch to be turned on, and upon the receipt of the second tone signal, it will respond with a HAS alert sound.

The Hold/off Alert System function is simple to understand and use. The following steps explain how HAS is operated by its users.

1. The calling party is put on hold by the called party.
2. The caller presses the HAS button to turn on Hold/off Alert System.
3. The caller confirms that the HAS lamp is lit and waits for an alerting sound.

If the HAS lamp is not lit, the HAS is not operable due to the called phone's incompatibility.

4. The called party releases the hold.
5. The calling phone sounds an alarm and the HAS lamp gets turned off automatically.

BRIEF DESCRIPTION OF THE DRAWINGS

A detailed description of embodiments of the invention will be made with reference to the accompanying drawings, wherein like numerals designate corresponding parts in the several figures.

FIG. 4 is a table explaining what conditions the audible HAS alert and the HAS lamp 29 get turned on.

DETAILED DESCRIPTION OF THE PREFERRED EMBODIMENTS

A detailed description of the present invention will be explained with respect to the drawings. The detailed description herein is mainly concerned with methods of the said system and the use and role of its components rather than their specificity because the bulk of the invention relies on the working of control processing means for both the calling phone and the called phone. Workings of the telephone are well known in the art. If any difficulty arises with understanding in the description of the said system or any of its components, one can consider the cross-referenced patent documents which are incorporated by reference for the general background of the art.

For the said system, one pre-determined and pre-specified DTMF tone signal must be used as the HAS tone signal in order for all HAS phones to be compatible and operable. The HAS function operates via the multiple transmissions of a tone signal from the called phone to the calling phone. The called phone herein is of the hold-initiating party and the calling phone is of the held party. Because HAS involves both the calling phone and the called phone, modifications to both are made and illustrated in FIG. 1 and FIG. 2.

Figure 1:
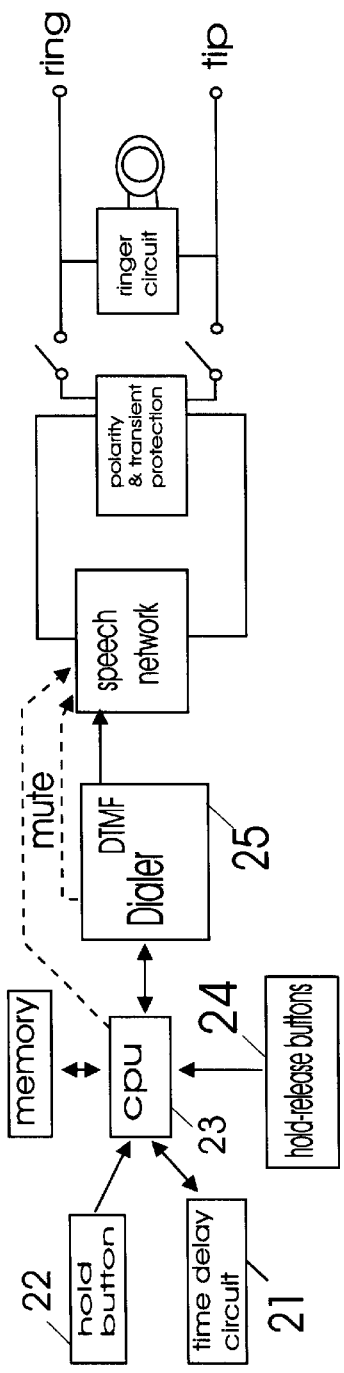
FIG. 1 is a schematic illustration of integrated HAS in the called phone.

In FIG. 1, the rudimentary schematic layout of the called phone with HAS integration is illustrated. The hold-release buttons 24 and the hold button 22 are connected to the phone's control processing means or otherwise known as CPU 23. The CPU 23 sends signals to the DTMF dialer 25 in a time-controlled manner to generate a tone signal. The CPU 23 can either be programmed if possible to generate time-delayed signals or be accommodated with a time delay circuit separate from its main processing means to generate such signals. Additionally, CPU 23 has an interface (not shown) which contains both a digital-analog converter and an analog-digital converter to receive and to produce appropriate electrical signals.

Figure 2:
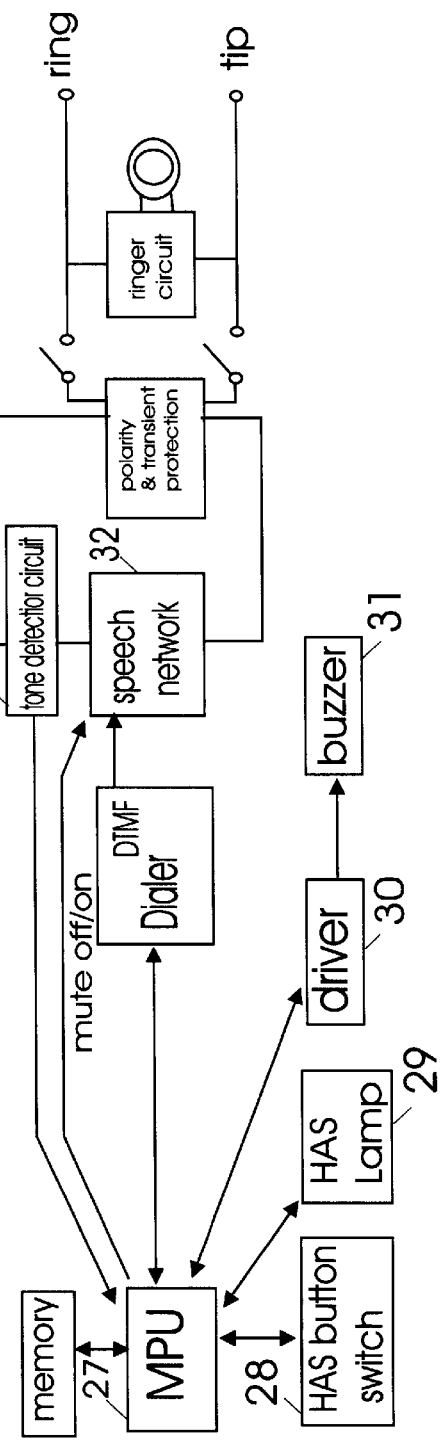
FIG. 2 is a schematic illustration of integrated HAS in the calling phone.

Whenever the hold button 22 or a hold-release button 24 is depressed, a predetermined DTMF signal is transmitted to the calling phone of FIG. 2. For the hold button 22 and all multiple hold-release buttons 24, same tone frequencies can be assigned. Moreover, the already existing dual tone frequencies for keys like the # key or * key can be doubly assigned both for the hold button 22 and hold-release buttons 24. If such an arrangement is made, the CPU 23 must trigger a tone generator means to produce the same tone signal as it would have responsive to the depression of other selected tone keys.

The said automatic tone generation from pressing a hold button or a hold-release button of the called phone is a significant departure from the earlier inventions not only because it asks for an internal modification to the called phones and but also because the said system becomes effective as it uses DTMF as a means of signal transmission, cost-efficient for the hold-initiating party as it asks for a minimum modification to the called phone, and time-saving as it sends DTMF signals automatically and swiftly with depression of a hold button or a hold-release button. The said system differs in terms of speed from the potentially time-consuming devices disclosed in U.S. Pat. No. 4,834,552 and U.S. Pat. No. 5,823,403. These devices make use of a voice playback mechanism and put the hold-initiating party on hold and tell him or her what must be done to reach the party on hold.

Compared to the called phone, the calling phone in FIG. 2 comprises more pronounced modifications. Both the HAS button switch 28 and the HAS lamp 29 is connected to the phone's control processing means which is herein referred to as MPU 27. Upon recognition of the first correct HAS tone signal via the tone detector circuit 33 of the calling phone, the MPU 27 enables HAS to be activated by the HAS button switch 28. The tone detector circuit 33 is connected to the line 34 which also carries voice signals to the speech network 32. The MPU 27 sends out a signal to mute the speech network 32 and then triggers a sound alert generator means such as buzzer 31 to produce a brief sound alert. A piezzo-electric buzzer is recommended for use as a sound alert generator means.

Just as the CPU 23 of the called phone, MPU 27 contains an interface (not shown) which sends and receives appropriate electrical signals from other circuits. The interface for example comprises an analog-digital converter and a digital-analog converter to convey a right form of signals to a main processing chip. It is suggested that as many circuits as possible be integrated to the chips in order to reduce costs.

Figure 3:
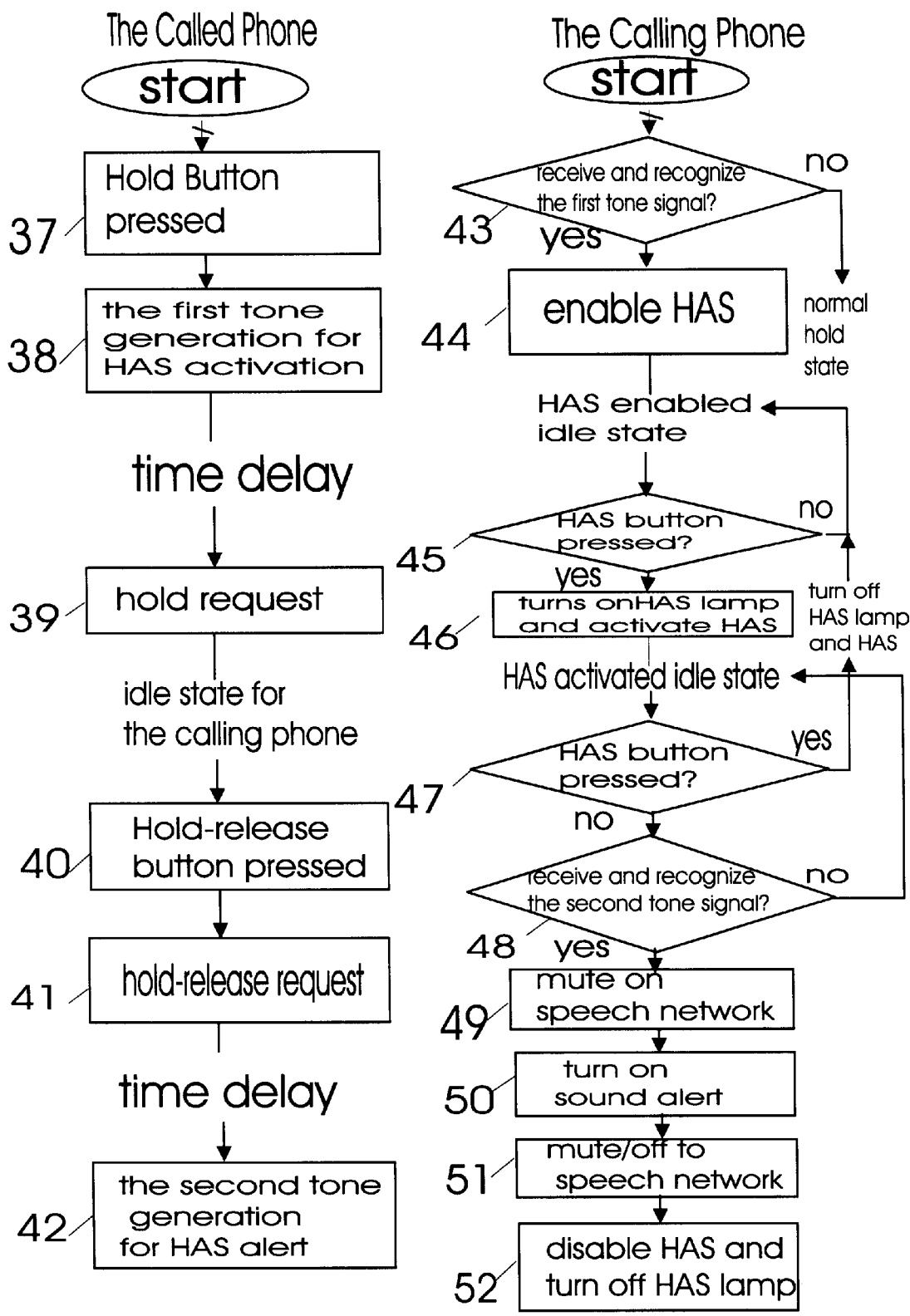
FIG. 3 is a step-by-step flowchart illustration of HAS for both called and calling phones.

The method of this invention is best illustrated by the flow chart in FIG. 3. When the hold button 22 is pressed in step 37, it generates the said tone signal at the DTMF dialer 25 but does not automatically generate the hold request. The pre-programmed CPU 23 or a time delay circuit 21 delays the hold request in step 39 by one second or less so that the tone signal can be transmitted to the calling phone before the hold gets activated. For the time delay circuit 21, a capacitor and a resistor are used, and their RC time constant must be selected to produce a desired time delay which results from the time needed for energy discharging of a capacitor. More detailed information of the resistor-capacitor circuit can be referenced from U.S. Pat. No. 4,337,378 or U.S. Pat. No. 4,918,720. The time delay should be fixed as short as possible but sufficient to allow the HAS tone signal transmission. The first tone generation from pressing the hold button 22 is shown as the step 38 in FIG. 3. While a tone signal is generated, it is preferable that the speech network of the called phone be muted either by the CPU 23 or by the DTMF dialer 25 in order to eliminate the tone ring-back for the called party as illustrated with dotted lines in FIG. 1.

After step 38, the calling phone receives the DTMF signal with a tone detector circuit 33 in step 43 in FIG. 3. There are a number of different tone detectors which can be used with the present invention. They can for example operate in the following manner as outlined in U.S. Pat. No. 5,265,079. First, they separate low and high band tone waves via the use of band filters. Second, they shape waveforms of tone waves and form pulse signals from wave forms. Third, they count the number of pulse signals and generate count-up signals. Fourth, they count the number of clock signals corresponding to the count-up signals. Fifth, they store values in a data register, and compare values to confirm if a correct tone signal is received. More information about tone detectors can be referenced from U.S. Pat. Nos. 5,265,079, 4,521,647, 4,868,872, and etc.

The tone detector circuit 33 recognizes the first HAS tone signal from the called phone and sends a signal to the MPU 27 of the calling phone in FIG. 2 which then enables HAS in step 44. Thus, HAS is ready to be turned on or to be activated by the HAS button switch 28 in step 45. The condition before the reception of the first HAS tone signal is herein designated as the HAS-disable mode and the condition after the reception of such signal as the HAS-enable mode. The normal state of a HAS-telephone is in the HAS-disable mode. In the HAS-disable mode, MPU 27 does not allow HAS-activation nor the HAS lamp 29 to turn on. Conversely, in the HAS-enable mode, MPU 27 allows HAS-activation and the HAS lamp 29 to turn on and further receive the second DTMF signal to generate an alerting sound. HAS is said to be activated only when the HAS button switch 28 is turned on in a HAS-enable mode. Thus, the HAS-disable mode changes to the HAS-enable mode after the reception of the first correct DTMF signal in step 44. However, without the HAS button switch 28 being turned on in step 45, HAS in the HAS-enable mode stays as non-functional and the receipt of the second tone signal will not cause a sound alert. Only when the HAS button 28 is pressed and HAS gets activated in a HAS-enable mode, the MPU 27 turns on the HAS lamp 29 in step 46 and sets off the buzzer 31 in step 50 after the receipt of the second HAS tone signal in step 48.

If for some reason the party on hold desires to aurally monitor the receiver after HAS activation in step 46, the HAS button 28 can also deactivate the HAS, turn off the HAS lamp 29, and revert the calling phone to a HAS-enabled idle state in FIG. 3. To do this, the HAS button 28 is simply pressed again in step 47. MPU 27 detects the change in current as the HAS button 28 is being pressed. If no action is taken place by the user in step 47, the phone precedes to step 48 where the phone receives the second HAS tone signal for a HAS alert.

For the calling phone, separating between the HAS-enable mode and the HAS-disable mode is the making of a distinction between a HAS-compatible called phone and a HAS-incompatible called phone. If the called phone is HAS-incompatible, callers get aware of it because the HAS lamp 29 does not turn on with the pressing of the HAS button switch 28. The relationship between the HAS lamp 29, the buzzer 31, the HAS-enable and HAS-disable condition vs. the HAS button switch 28 is shown in the table in FIG. 4.

When a hold-release button 24 is pressed in step 40, the CPU 23 of the called phone sends a signal to the DTMF dialer 25 in a time-controlled manner. More specifically, the hold-release buttons 24 do not send a direct input to the DTMF dialer 25 even though they trigger the generation of a DTMF signal for HAS. Rather, the CPU 23 controls the timing of their input to the DTMF dialer 25, possibly with its program or else with the time delay circuit aforementioned. Thus, the pressing of a hold-release button 25 generates a hold-release request immediately in step 41, while the second tone signal generation is delayed by the pre-programmed CPU 23 or by a time delay circuit for one second or less in step 42 to ensure that the tone signal gets transmitted to the calling phone. The time delay should be fixed as short as possible but sufficient to allow the HAS tone signal transmission.

The hold-release buttons 24 of the called phone in FIG. 1 are equivalent to the multiple buttons for different line channels in many business phones. Thus, for such phones each button for different line channels which deactivates the hold, working in conjunction with the phone's CPU 23 and its memory, should also generate the said HAS-tone signal which then gets transmitted to the calling phone. Equally, any computerized call holding device void of a manual hold or hold release button should respond with the said generation of HAS tone signals upon termination of either hold or hold release function.

Moving to step 48, the tone detector circuit 33 of the calling phone again receives a tone signal and then sends output signals to the phone's MPU 27 where the second tone signal is validated. Depending on the type of a tone detection means, the location where the confirmation of the tone signal occurs can be different and so can be the arrangement with MPU 27. The MPU 27 then mutes the speech network 32 in step 49 before it activates the buzzer 31. The MPU 27 sends a mute signal to the speech network 32 and a number of transistors (not shown) can be used to turn off the speech network 32. After the buzzer 31 sounds an alert in step 50, the MPU 27 normalizes the speech network 32 in step 51 and disables HAS and turns off the HAS lamp 29 in step 52. The normalization of speech network 32 requires a mute/off signal from MPU 27 which turns back on the speech network 32 via the use of transistors. Likewise, other HAS components such as the HAS lamp 29 and the buzzer 31 is turned on and off by MPU 27. The driver 30 for the buzzer 31 contains an amplifier means to amplify the electric signals for the buzzer 31. It is recommended that the time duration for an audible alert be brief, no more than one second just as to minimize the loss of time for the called party.

While the description above refers to particular embodiments of the present invention, it should be understood that many modifications may be made without departing from the spirit thereof. Thus, the accompanying claims are intended to cover these and other modifications as would fall within the true scope and spirit of the present invention.

The presently disclosed embodiments are therefore to be considered in all respects as illustrative and not restrictive. The scope of the invention is therefore indicated by the appended claims, rather than the foregoing description, and all changes which come within the meaning and range of equivalency of the claims are therefore intended to be embraced therein.

What is claimed is:

1. A telephone system with an associated Hold/off Alert System (HAS) comprising:
   a calling phone;
   a called phone in communication with the calling phone;
   a holding means in the called phone to place the calling phone on hold; and
   a HAS function incorporated in the internal circuitry of both the calling phone and the called phone, wherein the HAS function alerts the calling phone through a signal when the called phone releases the calling phone from hold;
   wherein the calling phone contains a control processing means working in conjunction with an interface which is capable of performing a number of additional functions including turning a visual indicator means for the HAS function on and off, receiving signals from a tone detection means, enabling and disabling the HAS function, muting a speech network, detecting on-and-off conditions of the HAS function activation button switch means, setting off a sound generator means, and activating and deactivating the HAS function.

2. The telephone system according to claim 1 wherein the calling phone includes a tone detection means which receives and validates a DTMF signal.

3. The telephone system according to claim 1 wherein the calling phone further comprises a button switch means which can either activate or deactivate the HAS system.

4. The telephone system according to claim 1 wherein the calling phone further comprises a visual indicator means which indicates if the HAS system is activated.

5. The telephone system according to claim 4 wherein the visual indicator means of the calling phone indicates whether the called phone is compatible with the HAS system.

6. The telephone system according to claim 1 wherein the calling phone contains a sound alert generator means which generates a brief audible alert to indicate to the calling phone is released from hold.

7. The telephone system according to claim 6 wherein a control processing means mutes the speech network just before the sound alert generator means produces an audible alarm, and normalizes the speech network after the sound alert generator means stops.

8. The telephone system according to claim 1 wherein the called phone further comprises a control processing means either with a time delay program or with a time delay circuit means in communication with a hold button and a hold-release button, wherein when either button is pressed, the control processing means sends a signal to a DTMF dialer in a time-controlled manner to generate a specific and pre-determined DTMF signal.

9. The telephone system according to claim 8 wherein a time delay between the activation or deactivation of hold function and transmission of the DTMF signal should be fixed as short as possible but sufficient to ensure the transmission of a HAS tone signal.

10. The telephone system according to claim 1, wherein a first tone generation immediately before the activation of a hold function from the called phone enables the HAS function In the calling phone to be activated, and a second tone generation immediately after the deactivation of a hold function from the called phone triggers a control processing means of the calling phone to generate a sound alert only if the HAS function of the calling phone has been activated beforehand.

11. A method of using a Hold/off Alert System (HAS) between a calling telephone and a called telephone having a hold function comprising the steps of:

initiating a hold mechanism from the called phone (i.e., pressing a hold button);

sending a first DTMF signal from the called telephone to the calling phone to enable the HAS function to be activated on the calling phone;

activating a hold function;

activating the HAS function from the calling phone;

ending the hold function from the called telephone; and sending a second DTMF signal from the called telephone to the calling phone to start a sound alert generator means;

performing, with a control processing means on the calling telephone working in conjunction with an interface, a number of additional functions including turning a visual indicator means for the HAS function on and off, receiving signals from a tone detection means, enabling and disabling the HAS function, muting a speech network, detecting on-and-off conditions of the HAS function activation button switch means, setting off a sound generator means, and activating and deactivating the HAS function.

* * * * *

UNITED STATES PATENT AND TRADEMARK OFFICE
CERTIFICATE OF CORRECTION

PATENT NO. : 6,301,346 B1
DATED : October 9, 2001
INVENTOR(S) : Issac Michael Lee It is certified that error appears in the above-identified patent and that said Letters Patent is hereby corrected as shown below:

<u>Title page,</u>
Inventor should read: -- Isaac Michael Lee --.

Signed and Sealed this

Eighteenth Day of February, 2003

JAMES E. ROGAN
*Director of the United States Patent and Trademark Office*